(12) United States Patent
Lee

(10) Patent No.: US 6,965,300 B2
(45) Date of Patent: Nov. 15, 2005

(54) METHOD AND DEVICE FOR SHOWING CONDITIONS OF A COMPUTER-RELATED APPARATUS

(75) Inventor: Chun Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 449 days.

(21) Appl. No.: 10/180,156

(22) Filed: Jun. 27, 2002

(65) Prior Publication Data

US 2004/0001005 A1 Jan. 1, 2004

(51) Int. Cl.$^7$ .................. G08B 1/00; G08B 21/00; G06F 11/00
(52) U.S. Cl. .................. 340/309.16; 340/309.3; 340/309.8; 340/995.1; 340/995.13; 714/22
(58) Field of Search .................. 340/636.1, 635, 340/636.19, 691.1, 691.6, 309.16, 516, 657, 340/525, 658, 691.3, 309.3, 309.8; 324/500, 324/510, 511, 520, 759, 765, 771, 542, 600, 324/714, 732; 714/22

(56) References Cited

U.S. PATENT DOCUMENTS

| 5,455,499 A | * | 10/1995 | Uskali et al. ............ 340/636.1 |
| 5,477,129 A | * | 12/1995 | Myslinski ................ 340/636.1 |
| 6,275,162 B1 | * | 8/2001 | Lo et al. .................. 340/636.1 |

* cited by examiner

Primary Examiner—Jeffery Hofsass
Assistant Examiner—Lam Pham
(74) Attorney, Agent, or Firm—Jacobson Holman PLLC

(57) ABSTRACT

A method and device for displaying the condition of an information-processing device is provided. The device includes a time unit, a register unit, a display unit and a detecting mechanism. The method is to detect the condition of the information-processing device with the detecting mechanism; to store the condition information in the register unit; to display the condition through the display unit, and to update the condition information periodically by signals from the time unit.

6 Claims, 3 Drawing Sheets

METHOD AND DEVICE FOR SHOWING CONDITIONS OF A COMPUTER-RELATED APPARATUS

BACKGROUND OF THE INVENTION

1. Field of the Invention

The invention generally relates to a method and device for showing the conditions of an electronic device, and particularly relates to a method and device for showing the working conditions of a computer-related apparatus.

2. Related Art

As electronic technologies are rapidly developed, people use electronic products more and more in their daily lives. Especially some computer-related apparatus, such as computers, are very popular for governments, enterprises, homes and persons for different kinds of uses.

In convention computer-related apparatus, a power supply generally provides a PGS (power good signal) and a power fail signal to the processing unit. The PGS is a signal informing that the power output is ready and the device can be turned on. While, the power fail signal indicates that the output is not ready or too low. The PGS and the power fail signal are generally identified by logical values "1" or "high" as power good, and "0" or "low" as power fail.

However, the PGS only indicates the condition of power supply, it does not provide the status of the information-processing device. Therefore, there is a prior art that utilizes the falling edge of PGS to fetch the condition of the information-processing device, and display through light emitting diodes (LED). However, when the PGS changes or disappears (that means the power is shut down or not stable), the condition of the information-processing device cannot be determined, which causes inconvenience to the user.

Hence, there is a need for us to acquire a device or method that can display the condition of an information device for easy reference at any time.

SUMMARY OF THE INVENTION

The object of the invention is to provide a method and device for displaying the condition of an information-processing device. The condition display includes real time conditions of the information-processing device before, during and after turn-on so that the user can refer anytime.

A device according to the invention includes a time unit, a register unit, a display unit and a detecting mechanism and method thereof. When a computer-related apparatus is working, the detecting mechanism inspects the conditions thereof and the results are stored in the register unit. Meanwhile, the condition is displayed through the display unit, and the condition information is updated periodically by signals from the time unit.

BRIEF DESCRIPTION OF THE DRAWINGS

The invention will become more fully understood from the detailed description given hereinafter. However, this description is for purposes of illustration only, and thus is not limitative of the invention, wherein.

DETAILED DESCRIPTION OF THE INVENTION

Figure 1:
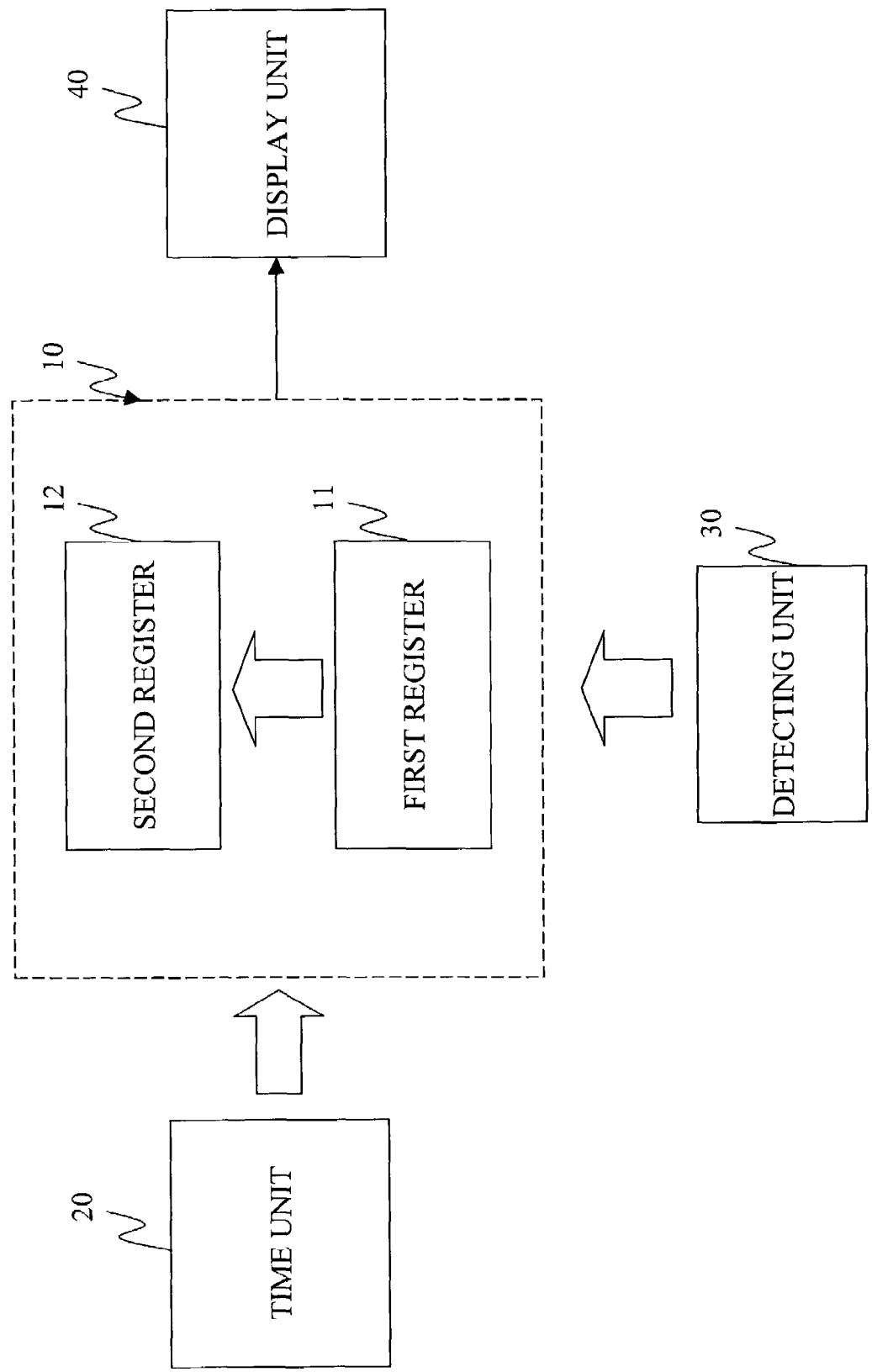
FIG. 1 is a block diagram of a device according to the invention.

As shown in FIG. 1, a device for displaying the condition of an information-processing device according to the invention mainly includes a register unit 10, a time unit 20, a display unit 40 and a detecting mechanism 30. The detecting mechanism 30 detects the condition of the information-processing device, and stores the condition information in the register unit 10. The time unit 20 generates a timing signal to the register unit 10 for updating the condition information. The time unit 20 can be replaced by another unit in the information-processing device that is capable of generating the same timing signal. The register unit 10 is connected to the time unit 20 so as to fetch the updated condition information of the detecting unit 30 when receiving the timing signal of the time unit 20. The condition information is transferred and displayed with the display unit 40. The display unit 40 includes one or more light emitting diodes (LED).

The register unit 10 further includes a first register 11 and a second register 12 connected to each other. The first register 11 stores the condition information detected by the detecting unit 30. The second register 12 copies the condition information from the first register 11 when receiving a timing signal provided by the time unit 20, and transfers the condition information to the display unit 40 for being displayed therewith.

Figure 2:
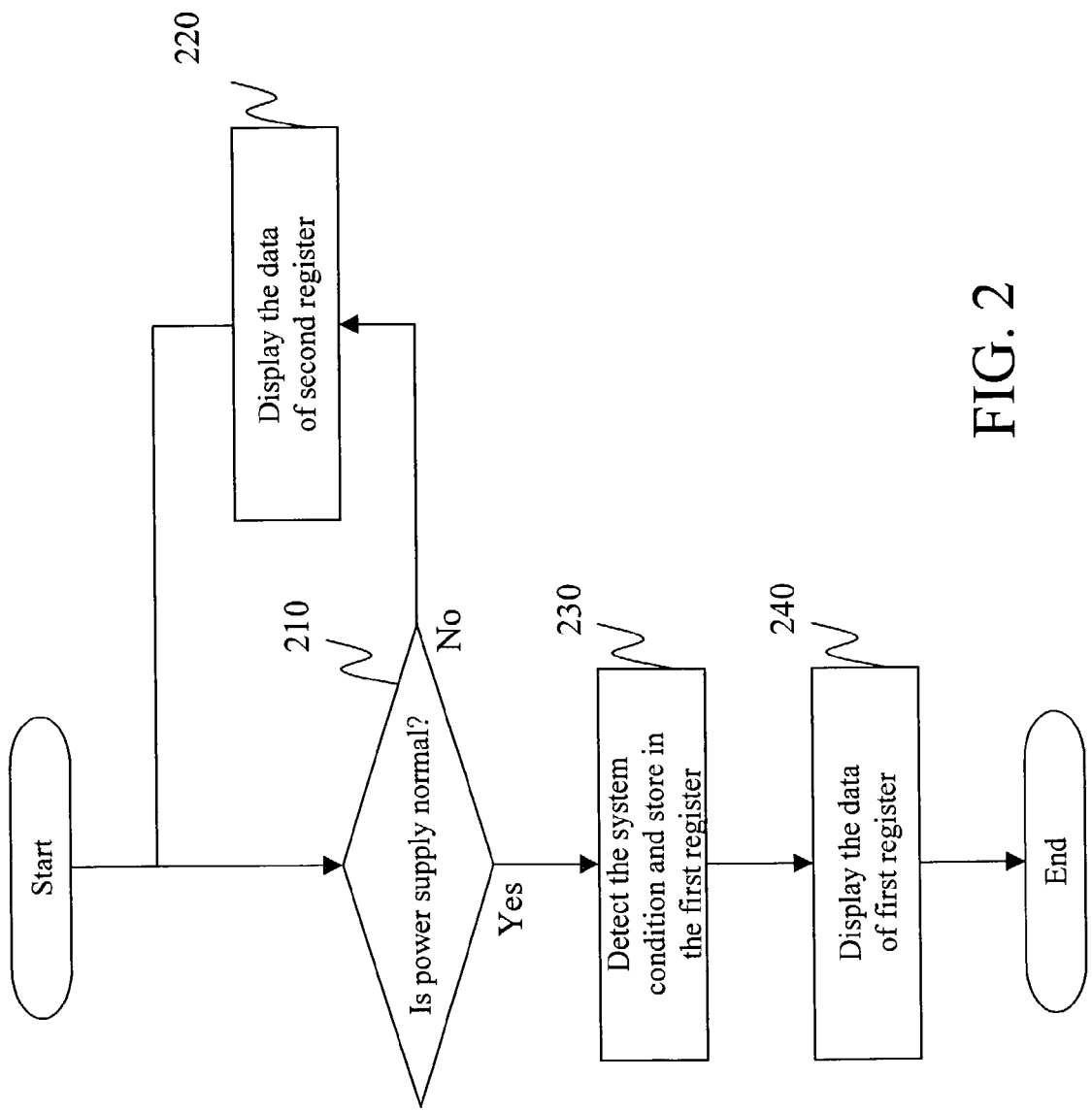
FIG. 2 is a flowchart of a method of the invention.
Figure 3:
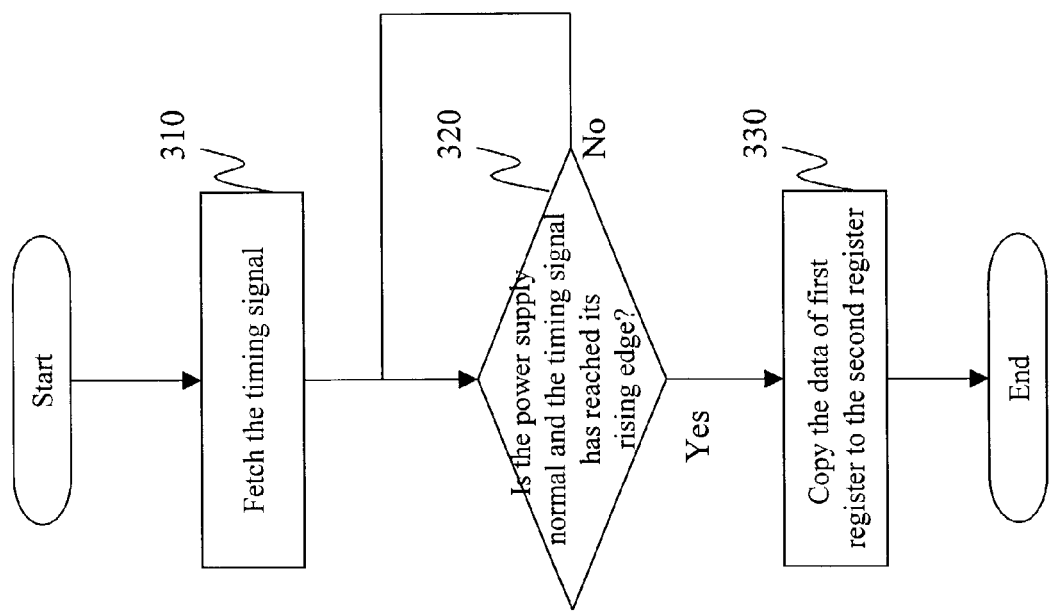
FIG. 3 is a flowchart of data-updating procedure in a method of the invention.

The method for displaying the condition of an information-processing device according to the invention includes steps of displaying the condition information and steps of updating the condition information, which are illustrated in FIG. 2 and FIG. 3 respectively.

In FIG. 2 of displaying condition information, the steps start from judging if the power supply is normal (step 210). The power supply means the power source of the information-processing device. When the power supply is abnormal, that means the information-processing device is being shut off, the display shows the condition information stored in a second register (step 220), which is the latest condition of the information-processing device before last turn-off. If the power supply is normal, that means the information-processing device is working, the current condition of the information-processing device is detected by a detecting mechanism and stored in a first register (step 230). The condition information is further displayed with a display unit (step 240).

In FIG. 3, the procedure of updating condition information includes the following steps. First, fetching a timing signal from a time unit (step 310). The timing signal is based on a frequency (time interval) predetermined in the information-processing device. Then, checking if the power supply is normal and the timing signal has reached its rising edge. If the power supply is abnormal, that means the information-processing device is off, returning and continuing the checking (step 320). If the power supply is normal, that means the information-processing device is working, then checking if the time signal has reached its rising edge. If not, returning and continuing the checking (step 320); if yes, fetching the condition of the information-processing device from the detecting mechanism, storing the condition information in the first register, copying the condition information to the second register (step 330) and displaying with the display unit. The condition information at least includes "system good", "system degraded" and "system critical" that can be displayed with lamps of light emitting diodes.

In conclusion, the invention provides a method and device for displaying the condition of an information-processing device all the time, no matter when the information-processing device is on or off. The invention utilizes a timing signal to update the condition information, and uses a second register to store the last condition information. The invention is advanced and practical since the prior arts can only show the condition of working.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for displaying a condition of a computer-related apparatus, which comprises a first register and a second register, comprising steps of:
   detecting said condition with a detecting mechanism;
   checking power supply of said computer-related apparatus, storing said condition to said first register when power supply is normal, and display said condition with a display unit;
   fetching a timing signal from said computer-related apparatus;
   checking power supply of said computer-related apparatus and said timing signal, updating said condition to said first register when power supply is normal and said timing signal reaches a rising edge;
   copying said condition from said first register to said second register; and
   displaying said updated condition with said display unit.

2. A method for displaying the condition of a computer-related apparatus according to claim 1 wherein said step of checking power supply comprises a step of displaying a prior condition information stored in said second register when said power supply is abnormal.

3. A method for displaying the condition of a computer-related apparatus according to claim 1 wherein said display unit comprises at least a light emitting diode.

4. A method for displaying the condition of a computer-related apparatus according to claim 1 wherein said condition information for display comprises a condition of "system good".

5. A method for displaying the condition of a computer-related apparatus according to claim 1 wherein said condition information for display comprises a condition of "system degraded".

6. A method for displaying the condition of a computer-related apparatus according to claim 1 wherein said condition information for display comprises a condition of "system critical".

* * * * *